United States Patent
Saavedra (10) Patent No.: US 9,664,180 B2
(45) Date of Patent: May 30, 2017

(54) POWER GENERATING SYSTEM UTILIZING EXPANDING LIQUID

(71) Applicant: John A. Saavedra, Irmo, SC (US)

(72) Inventor: John A. Saavedra, Irmo, SC (US)

( * ) Notice: Subject to any disclaimer, the term of this patent is extended or adjusted under 35 U.S.C. 154(b) by 151 days.

(21) Appl. No.: 14/629,606

(22) Filed: Feb. 24, 2015

(65) Prior Publication Data

US 2015/0247489 A1 Sep. 3, 2015

Related U.S. Application Data

(63) Continuation of application No. 14/193,087, filed on Feb. 28, 2014, now abandoned.

(51) Int. Cl.
*F03G 7/00* (2006.01)
*F03G 6/02* (2006.01)

(52) U.S. Cl.
CPC ............... *F03G 6/02* (2013.01); *Y02E 10/46* (2013.01)

(58) Field of Classification Search
USPC .............. 290/43, 54, 1 R; 320/101; 318/117; 60/641.12, 641.11; 323/906; 126/569, 126/604
See application file for complete search history.

(56) References Cited

U.S. PATENT DOCUMENTS

| | | | |
|---|---|---|---|
| 3,903,700 A * | 9/1975 | Glickman | F03G 6/00 126/643 |
| 4,009,575 A * | 3/1977 | Hartman, Jr. | F01K 5/02 126/263.01 |
| 4,230,531 A * | 10/1980 | Fernandopulle | C02F 1/047 202/180 |
| 4,271,826 A * | 6/1981 | Duchene | F24J 2/045 126/569 |
| 4,280,328 A * | 7/1981 | Falconer | F03G 6/003 126/636 |
| 4,291,232 A * | 9/1981 | Cardone | F03B 17/005 290/1 R |
| 4,452,046 A * | 6/1984 | Valentin | F03D 1/04 290/55 |
| 4,471,617 A * | 9/1984 | De Beer | F03G 6/00 417/379 |
| 6,672,064 B2 * | 1/2004 | Lawheed | F01C 1/123 60/641.11 |
| 7,931,019 B2 * | 4/2011 | Lin | F04B 17/006 126/569 |
| 8,146,362 B2 * | 4/2012 | Howard | F03G 7/05 290/1 R |
| 8,739,534 B2 * | 6/2014 | Lee | F01K 3/16 126/600 |
| 2010/0186410 A1 * | 7/2010 | Cogswell | F01K 25/10 60/671 |

(Continued)

*Primary Examiner* — Julio C. Gonzalez
(74) *Attorney, Agent, or Firm* — Dority & Manning, P.A.

(57) ABSTRACT

The present disclosure provides a system and method for generating power, such as electrical power, using an increased volume of a working liquid in a tank when the working liquid is heated. The increased volume of the working liquid may increase a pressure in the tank such that a portion of the working liquid is forced through one or more fluid lines towards a hydraulic generator. The hydraulic generator may then generate electricity based at least in part on the portion of fluid transferred to the hydraulic lines.

16 Claims, 4 Drawing Sheets

(56) References Cited

U.S. PATENT DOCUMENTS

| | | | |
|---|---|---|---|
| 2010/0244449 A1* | 9/2010 | Lee | F01K 3/16 |
| | | | 290/52 |
| 2011/0289922 A1 | 12/2011 | Myers et al. | |
| 2012/0112473 A1* | 5/2012 | Glynn | B01D 1/0035 |
| | | | 290/1 R |
| 2013/0205778 A1 | 8/2013 | Hansen | |

* cited by examiner

POWER GENERATING SYSTEM UTILIZING EXPANDING LIQUID

FIELD

The present disclosure relates generally to a system and method for generating power, such as electrical power, from the expansion of a fluid due to temperature differentials.

BACKGROUND

Worldwide demand for energy, especially electrical energy, or electrical power, continues to grow. Domestic energy prices continue to rise and challenges arising from foreign political instabilities, especially with regard to fossil fuels like crude oil, brings uncertainty into future energy prices. At the same time, by certain accounts, known reserves of fossil fuels like crude oil are declining, and may not be renewed in the foreseeable future.

A percentage of the increased demand in electrical power may come from developing countries attempting to add people to community power supplies, as a measurable percentage of the world's population still lives without access to electrical power. This percentage may correlate closely in certain geographical regions with poverty, illiteracy, reduced life expectancy, infant mortality, unsafe drinking water, crop failure, water-borne diseases, and other negative consequences.

Attempts have been made to harness energy from various renewable sources in an attempt to curtail the issues above. For example, certain systems and methods have attempted to generate energy from temperature differentials in bodies of water, such as a lake. These systems generally include a phase change fluid as the working fluid, and thus generally require, e.g., condensers, evaporators, and a phase change fluid finely tuned to change from a liquid to a gas over the relatively narrow temperature differential available. Accordingly, said systems may require a region having extremely consistent temperatures in order to operate consistently.

Accordingly, a system and method for generating electrical power that could operate over a wide range of temperature differentials and/or without the requisite complicated equipment of the prior art would be beneficial. More particularly, a system and method for generating electrical power using an expanding liquid heated using a renewable energy source or using waste energy would be particularly useful.

SUMMARY

Aspects and advantages of the invention will be set forth in part in the following description, or may be obvious from the description, or may be learned through practice of the invention.

In one exemplary embodiment of the present disclosure, a system is provided for generating electrical power from the expansion of a working liquid. The exemplary system includes a tank including the working liquid and defining an internal pressure, the working liquid defining a temperature. The exemplary system also includes a heating device in thermal communication with the working liquid in the tank for heating the working liquid in the tank such that the temperature of the working liquid increases. Additionally, the system includes a fluid line in fluid communication with the tank for receiving a portion of the working liquid in the tank when the internal pressure of the tank increases. Moreover, the system includes a hydraulic generator in communication with the fluid line and configured to generate electricity when the fluid line receives working liquid from the tank.

Additionally, in an exemplary aspect of the present disclosure, a method is provided for generating electrical power using the expansion of a working liquid in a tank defining an internal pressure. The exemplary method includes heating the working liquid in the tank to a second temperature such that the volume of the working liquid increases and the internal pressure defined by the tank increases. The method also includes transferring a portion of the working liquid through a fluid line using the increased internal pressure defined by the tank. Additionally, the exemplary method includes generating electricity with a hydraulic generator in fluid communication with the fluid line using the portion of working liquid transferred through the fluid line.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is related generally to a system and method of generating power, such as electrical power, using the expansion of a working liquid exposed to a temperature differential. More particularly, the present disclosure is related to a system and method of harnessing the power generated from the expansion of a working liquid as it is heated within a tank.

Figure 1:
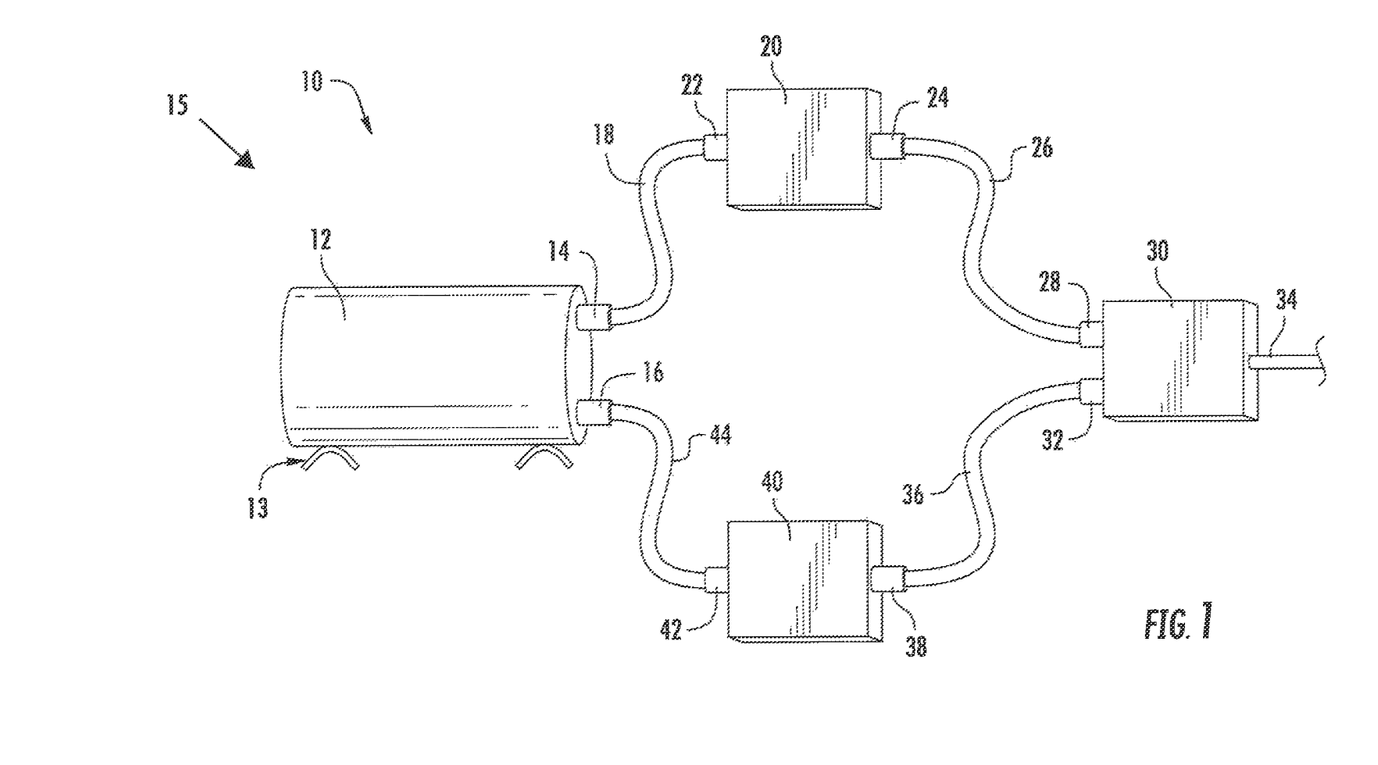
FIG. 1 provides diagrammatic view of a system for generating electrical power using expanding liquid in accordance with an exemplary embodiment of the present disclosure.

Referring now to the FIGS., FIG. 1 provides a diagrammatic view of an exemplary system 10 for generating power, such as electrical power, using an expansion of a working liquid when the working liquid is heated. More particularly, for the exemplary embodiment of FIG. 1, the system 10 generally includes a tank portion 15 (including a tank 12), an accumulator 20, a hydraulic generator 30, and a fluid reservoir 40. Although not pictured in the exemplary embodiment of FIG. 1, the system 10 may additionally include a heating device for heating the working liquid in the tank and a cooling device for cooling the working liquid in the tank (see FIGS. 2 through 5).

The tank 12 of FIG. 1 comprises the working liquid and defines an internal pressure. In certain embodiments, the working liquid in the tank 12 may take up all or substantially all of an internal volume of the tank 12. The tank 12 is mounted on a stand 13 and includes an outlet valve 14 fluidly connected to a first outgoing fluid line 18. The accumulator 20 includes an inlet valve 22 also fluidly connected to the fluid line 18. Accordingly, for the exemplary embodiment of FIG. 1, the tank 12 is fluidly connected to the accumulator 20.

The exemplary tank 12 of FIG. 1 may be comprised of any suitable material. For example, in certain exemplary embodiments, the tank 12 may be comprised of stainless steel, aluminum, tin, brass, iron, or any other suitable metal. Alternatively, in other exemplary embodiments, the tank may be comprised of any suitable plastic material such as an acrylonitrile butadiene styrene (ABS), polyethylene terephthalate (PET), high-density polyethylene (HDPE), polyvinyl chloride (PVC), polypropylene (PP), high impact polystyrene (HIPS), or any other suitable plastic. Additionally, in still other exemplary embodiments, the tank 12 may be comprised of a combination of the above materials, or any other suitable material. For example, the tank 12 may be comprised of a material configured to minimize an amount of thermal expansion of the tank 12.

It should also be appreciated that the exemplary tank 12 of FIG. 1 may be any suitable size or shape. For example, the tank 12 of FIG. 1 may be a relatively large tank, such as a 5,000 gallon tank, a 10,000 gallon tank, a 20,000 gallon tank, or even larger. Alternatively, the tank may be a relatively small tank, such as a 100 gallon tank, a 55 gallon tank, a 25 gallon tank, a 5 gallon tank, or even smaller. Further, the tank 12 may have any other size therebetween.

The system 10 may further include a plurality of tanks 12 in parallel connection or in series connection with the fluid line 18, the accumulator 20, and/or the generator 30. Further, the size, number, and construction of the tank(s) 12 may be optimized for the exemplary system 10 (i.e., for the accumulator 20, if provided, the hydraulic generator 30, and the various fluid lines and valves described herein).

Moreover, it should also be appreciated that as used herein the term "tank" refers to any suitable liquid-tight container that defines an approximately fixed volume. More particularly, tank as used herein refers to any container that is capable of withstanding an increased internal pressure from the expansion of a working liquid such that a portion of the working liquid is forced through the outlet valve 14. Accordingly, tank may refer to a rigid tank, or alternatively may refer to a semi-rigid tank or flexible tank.

Furthermore, the working liquid of the system 10 may be any suitable liquid configured to expand and retract. For example, the working liquid may in certain exemplary embodiments be water, a water solution, vegetable oil, motor oil, ammonia, or any other suitable liquid. The optimal working liquid used in the system 10 may be determined based at least in part on the availability, the coefficient of thermal expansion, the compressibility, the toxicity, the freezing temperature (and the expected temperature of the environment in which the system 10 is to be used), etc.

Referring still to FIG. 1, the accumulator 20 further includes an outlet valve 24 fluidly connected to an inlet valve 28 of the hydraulic generator 30 using the second outgoing fluid line 26. The accumulator 20 may be may be any device suitable for receiving and/or storing a portion of working liquid from fluid line 18 and the tank 12 and releasing a quantity of hydraulic fluid at a desired system pressure, flow rate, or both. For example, the accumulator 20 may be configured to receive and/or store working liquid when the internal pressure in the tank 12 and/or in the line 18 is above a minimum pressure threshold and then to release the hydraulic fluid at a constant pressure, a constant flow rate, or both through the fluid line 26 to the generator 30. Accordingly, as stated above, the number, size, and construction of the tank 12 may be optimized such that the working liquid transferred to the fluid line 18 from the tank 12 when the working liquid in the tank 12 expands is at a pressure that exceeds the minimum pressure threshold required for the accumulator 20.

For the exemplary embodiment of FIG. 1, the hydraulic fluid is the same as the working liquid. In other exemplary embodiments, however, the hydraulic fluid may be any other suitable hydraulic fluid. For example, in such an embodiment, the accumulator 20 may be configured to receive working liquid from the tank 12 and to transfer a hydraulic fluid having desired properties (such as non-compressibility, proper viscosity, low and/or high temperature fluidity, biodegradability, low toxicity, etc,) to the hydraulic generator 30.

With continued reference to FIG. 1, the hydraulic generator 30 is also in communication with the fluid line 18 and the tank 12 through the accumulator 20. More particularly, for the exemplary embodiment of FIG. 1, the hydraulic generator 30 is in fluid communication with the accumulator 20 through fluid line 26, which is in fluid communication with the tank 12 through fluid line 18. The hydraulic generator 30 is configured to generate electrical power using the portion of working liquid that flows through fluid line 18 toward the generator 30. More particularly, the working liquid may rotate a turbine in the hydraulic generator 30 which may in turn be used for generating electrical power. For the exemplary embodiment of FIG. 1, the amount of energy generated may be optimized by the inclusion of the accumulator 20. For example, the hydraulic generator 30 may define an optimum pressure, speed, and/or flow rate or flow volume for generating electricity, and the accumulator 20 may be configured to provide the hydraulic fluid through the fluid line 26 at or near the optimum pressure, speed, and/or flow rate or flow volume.

Additionally, the hydraulic generator 30 is configured to transfer electrical power to, for example, a means for storing such electrical power, such as a battery pack, or to an electrical grid, or alternatively directly to, for example, a household or one or more electricity consuming device(s). An electrical output line 34 is provided for such functionality.

The exemplary system 10 of FIG. 1 may therefore generate electricity when the temperature, and therefore the volume, of the working liquid in the tank 12 is increased, such that the internal pressure in the tank 12 is increased. In such a case, the internal pressure in the tank 12 may force a portion of the working liquid through the outlet valve 14 and through the fluid line 18 at a pressure that exceeds the minimum pressure threshold for the accumulator 20. Once the pressure in the accumulator 20 is above a predetermined threshold, the accumulator 20 may transfer the hydraulic fluid through the outlet valve 24 to the fluid line 26, and through the fluid line 26 to the inlet valve 28 of the generator 30, such that the generator 30 may generate electrical power, or electricity. Additionally, or alternatively, the outlet valve 14 may be a pressure relief valve, such that working liquid is not transferred from the tank 12 to the fluid line 18 until the pressure in the tank 12 exceeds an optimum threshold. The optimum threshold may be any pressure threshold determined to increase the efficiency of the exemplary system 10. For example, the optimum threshold may be equivalent to the minimum pressure threshold of the accumulator 20.

Referring still to the exemplary system 10 of FIG. 1, a first return fluid line 36 is provided in fluid communication with the hydraulic generator 30 and the tank 12. The return fluid line 36 is configured to return the hydraulic fluid, which for the exemplary embodiment of FIG. 1 is the same as the working liquid, to the tank 12 after flowing through the generator 30. More particularly, the first return fluid line 35 is fluidly connected to an outlet valve 32 of the hydraulic generator and an inlet valve 38 of the fluid reservoir 40. A second return fluid line 44 is also provided fluidly connected to the outlet valve 42 of the reservoir 40 and the inlet valve 16 of the tank 12. Accordingly, for the exemplary embodiment of FIG. 1, the hydraulic generator 30 is in fluid communication with the reservoir 40 and the reservoir 40 is in fluid communication with the tank 12.

The first return fluid line 36 may transfer working liquid from the generator 30 to the reservoir 40, and the second return fluid line 44 may return working liquid from the reservoir 40 to the tank 12. In certain exemplary embodiments, the working liquid in the reservoir 40 and fluid line 44 may be substantially at an atmospheric pressure. Therefore, the reservoir 40 is configured to provide working liquid to the tank 12 based at least in part on the internal pressure of the tank 12.

In certain exemplary embodiments, one or more of the valves provided in the exemplary system 10 may be one-way valves, or check valves, to ensure a proper fluid flow direction. For example, one or more of outlet valves 14, 24, 32, and 42 may be one-way valves only allowing the working liquid or other fluid to flow out of one or more of the tank 12, accumulator 20, generator 30, and reservoir 40, respectively. Similarly, one or more of inlet valves 16, 22, 28, and 38 may be one-way valves only allowing the working liquid or other fluid to flow into one or more of the tank 12, accumulator 20, generator 30, and reservoir 40, respectively.

Additionally, it should be appreciated, that the exemplary system 10 of FIG. 1 is provided by way of example only, and in other exemplary embodiments, the exemplary system 10 may have any other suitable configuration. For example, in other exemplary embodiments, the system 10 may not include the accumulator 20 (or fluid line 26) and the fluid line 18 may be directly connected to the inlet valve 28 of the generator 30. Similarly, in other exemplary embodiments, the system 10 may not include the reservoir 40 (or fluid line 44) and the fluid line 36 may be directly connected to the inlet valve 16 of the tank 12. Further, in still other exemplary embodiments, the reservoir 40 may instead be fluidly connected to the generator 30 and the accumulator 20. In such an exemplary embodiment, the hydraulic fluid may be a fluid other than the working liquid. Additionally, or alternatively, in yet another exemplary embodiment, the reservoir 40 may be fluidly connected to the accumulator 20 and the tank 12. In such an exemplary embodiment, the system 10 may include a plurality of reservoirs, and one or more additional fluid lines and valves as necessary.

Figure 2:
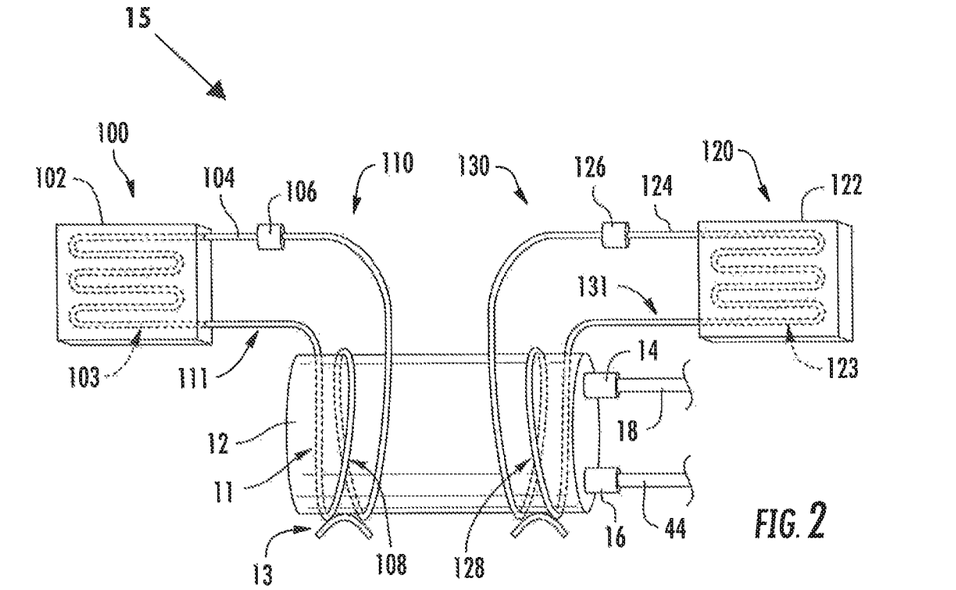
FIG. 2 provides diagrammatic view of a tank portion in accordance with an exemplary embodiment of the present disclosure.

With reference now to FIG. 2, a diagrammatic view of another embodiment of a tank portion 15 of the exemplary system 10 depicted in FIG. 1 is provided. More particularly, FIG. 2 provides a diagrammatic view of the tank 12 and working liquid in thermal communication with a heating device for heating the working liquid from a first temperature to a second temperature and a cooling device for cooling the working liquid from the second temperature to the first temperature. The heating device may heat the working liquid during a heating cycle and the cooling device may cool the working liquid during a cooling cycle.

For the exemplary embodiment of FIG. 2 the heating device for heating the working liquid comprises a heat collector system 100. The exemplary heat collector system 100 of FIG. 2 includes a heat collector 102 with a fluid line 104 including a thermal transfer fluid and defining a heat collecting portion 103. The fluid line 104 of the heat collector system 100 further defines transfer portions 110, 111 extending between the heat collector 102 and the tank 12 and a heat delivery portion 108 in thermal communication with the tank 12 and/or working liquid positioned therein. A pump 106 is provided to circulate the thermal transfer fluid within the fluid line 104 when the heat collector system 100 is activated, i.e., during a heating cycle. In certain exemplary embodiments, the pump 106 may be powered at least in part by the generator 30. Additionally, for the exemplary heat collector system 100 of FIG. 2, the heat delivery portion 108 of the fluid line 104 is wrapped around an outer surface 11 of the tank 12 such that it may transfer heat to the tank 12 and from the tank 12 to the working liquid positioned therein.

The heat collector 102 may be positioned in any suitable location to collect heat. For example, in certain exemplary embodiments the heat collector 102 may be positioned on or integrated into a surface or body that generally receives radiant thermal energy from the sun. For example, the heat collector 102 may be positioned on or integrated into a road or highway, a street sign, an exterior of a building (such as a wall, roof, or door of a building), an interior of a building heated by thermal energy (such as an attic, sunroom, or greenhouse), or a body of water (such as a lake or water tower). When the heat collector 102 is positioned in or adjacent to a body of water, the heat collector 102 may be positioned in or adjacent to a top end, or shallow part, of the body of water so as to collect heat from the warmest area of said body of water. Additionally, in other exemplary embodiments, the heat collector may be positioned on or in, or integrated into, any system generating waste heat. For example, the heat collector 102 may be positioned to collect waste heat from combustion processes, chemical processes, or manufacturing processes (such as in or proximate to cooling towers or other areas in a power plant); proximate to waste heat generated in a vehicle (such as between a radiator and an engine block, positioned in or proximate to or incorporated into an exhaust or turbocharger, incorporated into a supercharger, positioned proximate to one or more of the brakes, etc.); or in a storm water drain to collect heat from heated storm water draining off a road or highway. In any of the above embodiments, the system 10 (including the tank 12) may be appropriately sized to operate proximate to the heat collector 102. Further, in still other embodiments, the heat collector 102 may be positioned to directly receive radiant thermal energy from the sun, either adjacent to the ground or in an above ground position, and may include one or more reflectors to concentrate the thermal energy from the sun on the heat collector. Moreover, in still other exemplary embodiments, the heat collector system 100 may additionally include a plurality of heat collectors 102 positioned in, on, or proximate to, or integrated into any suitable location.

The thermal transfer fluid in the fluid line 104 may be comprised of any suitable fluid for transferring thermal energy from the heat collector 102 to the tank 12 and/or the working liquid positioned therein. For example, in certain exemplary embodiments, the fluid may be a phase change fluid, or alternatively may be a single phase fluid. Suitable fluids include without limitation, refrigerants such as R-400 and R-500 hydroflurocarbons blends, water, various oils, or air. Other fluids may be used as well.

Similarly, for the exemplary embodiment of FIG. 2, the cooling device for cooling the working liquid comprises a heat sink system 120. The exemplary heat sink system 120 of FIG. 2 includes a heat sink 122 and a fluid line 124 including a heat transfer fluid and defining a heat dispersing portion 123. The fluid line 124 of the heat sink system 120 further includes first and second heat transfer portions 130, 131 extending between the heat sink 122 and the tank 12 and a heat removal portion 128 in thermal communication with the tank 12 and/or the working liquid positioned therein. A pump 126 is provided to circulate the thermal transfer fluid within the fluid line 124 when the heat sink system 120 is activated, i.e., during a cooling cycle. In certain exemplary embodiments, the pump 126 may be powered at least in part by the generator 30. Additionally, for the exemplary heat sink system 120 of FIG. 2, the heat removal portion 128 of the fluid line 124 is wrapped around the outer surface 11 of the tank 12 such that it may remove heat from the tank 12 and/or from the working liquid positioned therein.

The heat sink 122 may be positioned in any suitable location to dissipate heat. For example, in certain exemplary embodiments the heat sink 122 may be positioned in a location shielded from the thermal energy from the sun. For example, the heat sink 122 may be positioned underground, such as buried underground, or underneath or adjacent to one or more structures such that it is positioned in the shade. Additionally, in other exemplary embodiments, the heat sink 122 may be positioned in or adjacent to a body of water. When, for example the heat collector 102 is also positioned in a body of water, the heat sink 122 may be positioned deeper in the same body of water such that it is surrounded by water having a lower temperature than the water surrounding the heat collector 102. For example, the heat collector 102 may be positioned at a top of a tank, such as at a top of a water tower, and the heat sink 122 may be positioned at a bottom of the tank, such as at a bottom of the water tower, or in any other suitable location. Additionally, or alternatively, the heat sink may be positioned downstream in a flow path of a dam, such that the heat sink 122 is exposed to the cool water at the bottom of the upstream body of water. It should be appreciated, however, that in still other exemplary embodiments, the heat sink 122 may be placed in any other suitable location to dissipate heat.

As with the heat collector system 100, the fluid line 124 in the heat sink system 120 may contain any suitable fluid for transferring thermal energy from the tank 12 and/or the working liquid positioned therein to the heat sink 122.

It should be appreciated, however, that the exemplary heat collector system 100 and heat sink system 120 of FIG. 2 is provided by way of example only, and other exemplary embodiments of the present disclosure, the systems 100, 120 may have any other suitable configuration. For example, in other exemplary embodiments, the heat delivery portion 108 of the heat collector system 100 and the heat removal portion 128 of the heat sink system 120 may have any other suitable configuration for delivering and removing heat, respectively, from the working liquid and/or the tank 12. For example, with reference to FIG. 3, another exemplary embodiment of the tank portion 15 of the system 10 of FIG. 1 is provided with an alternative embodiment of the heat collector system 100. In the exemplary heat collector system 100 of FIG. 3, the heat delivery portion 108 of the fluid line 104 and the heat removal portion 128 of the fluid line 124 are each positioned within the tank 12 to directly deliver heat to and remove heat from, respectively, the working liquid positioned within the tank 12. In other exemplary embodiments, however, the heat delivery portion 108 and heat removal portion 128 may have any other suitable configuration for being in thermal communication with the tank 12 and/or working liquid positioned therein.

Figure 3:
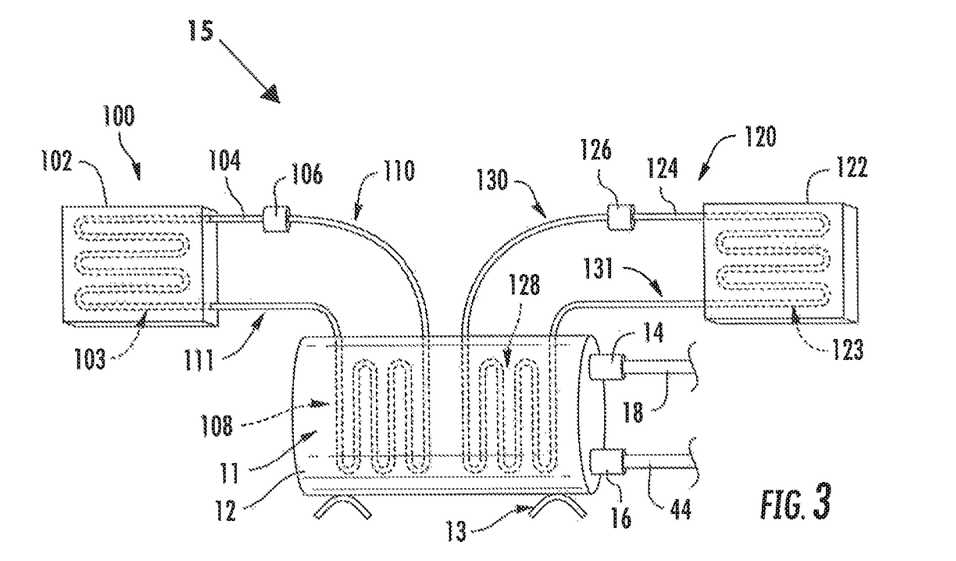
FIG. 3 provides diagrammatic view of another tank portion in accordance with another exemplary embodiment of the present disclosure.

Additionally, in still other exemplary embodiments of the present disclosure, the pumps 106 and 126 may be positioned anywhere within the respective systems 100 and 120. Further, the heat transfer portions 110, 111 and 130, 131 of the fluid lines 104, 124, respectively, may have any suitable configuration for transferring heat to and/or from the working liquid in the tank 12, and may in certain exemplary embodiments be insulated. Moreover, in yet another exemplary embodiment of the present disclosure, the system 10 may not include one or both of the heat collector system 100 and/or the heat sink system 122.

Figure 4A:
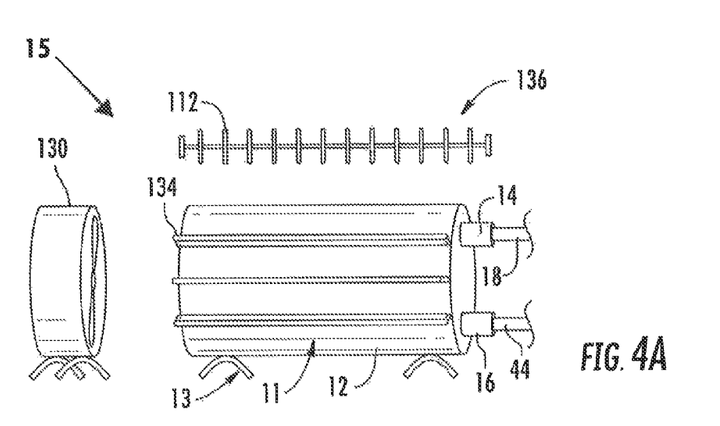
FIG. 4A provides diagrammatic view of yet another tank portion in accordance with yet another exemplary embodiment of the present disclosure, wherein the tank is being heated.
Figure 4B:
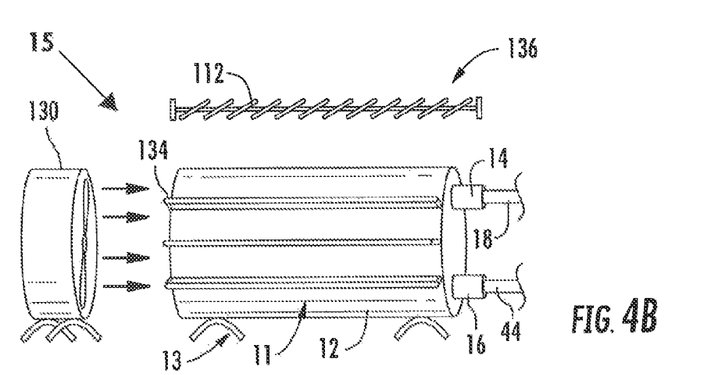
FIG. 4B provides diagrammatic view of the exemplar tank portion of FIG. 4A, wherein the tank is being cooled.

Referring now to FIGS. 4A and 4B, another exemplary embodiment of a tank portion 15 of the power generating system 10 of FIG. 1 is provided. As with the exemplary tank portions 15 of the power generating system 10 of FIGS. 2 and 3, the exemplary tank portion 15 of the power generating system 10 of FIGS. 4A and 4B includes a heating device for heating the tank 12 and/or the working liquid positioned therein and a cooling device for cooling the tank 12 and/or the working liquid positioned therein.

For the exemplary embodiment of FIGS. 4A and 4B, the tank portion 15 of the power generating system 10 includes a shading structure 136 having at least a portion positioned above the tank 12, such that the shading structure 136 includes a portion positioned between the tank 12 and radiant thermal energy from the sun. As shown the structure 136 includes a plurality of slats 112 moveable between an open position, as shown in FIG. 4A, and a closed position, as shown in FIG. 4B. Accordingly, when the slats 112 are in the open position, radiant thermal energy from the sun may heat the tank 12. Alternatively, when the slats 112 are in the closed position, radiant thermal energy from the sun is blocked from reaching the tank 12, such that the tank 12 is positioned in the shade. Accordingly, the shading structure 136 may be considered part of the heating device and the cooling device.

The heating device may further include a surface coating on the tank 12 to assist in the absorption of radiant energy from the sun to heat the tank and/or the working liquid positioned therein. For example, the surface coating may be a flat black paint coating. Notably, in certain exemplary embodiments, the surface coating may include any suitable advertising indicia or trademark indicia. The advertising and/or trademark indicia may be positioned for optimal viewing and may be comprised of a color and/or material to assist in the absorption of radiant energy from the sun.

The cooling device of the exemplary tank portion 15 of FIGS. 4A and 4B additionally includes a plurality of fins 134 on the tank 12 and a fan 130 configured to circulate air over and around the tank 12. The fins 134 of FIGS. 4A and 4B are fixed to the side of the tank 12, however, it should be appreciated that in other exemplary embodiments, the fins 134 may be removable, or alternatively may move between an extended and retracted position. The fan 130 may be powered at least in part by the generator 30.

A heating cycle of the exemplary tank portion 15 of FIGS. 4A and 4B is depicted in FIG. 4A, wherein the slats 112 of the shading structure 134 are in the open position such that radiant energy from the sun may pass therethrough and be absorbed by the tank 12 and the surface coating on an outer surface 11 of the tank 12. Moreover, a cooling cycle is depicted in FIG. 4B, wherein the slats 112 of the shading structure 134 are in the closed position, such that the tank 12 is shaded, and the fan 130 is operating to flow air over and/or around the tank 12 and fins 134 to cool the tank 12 and the working liquid therein.

Figure 5:
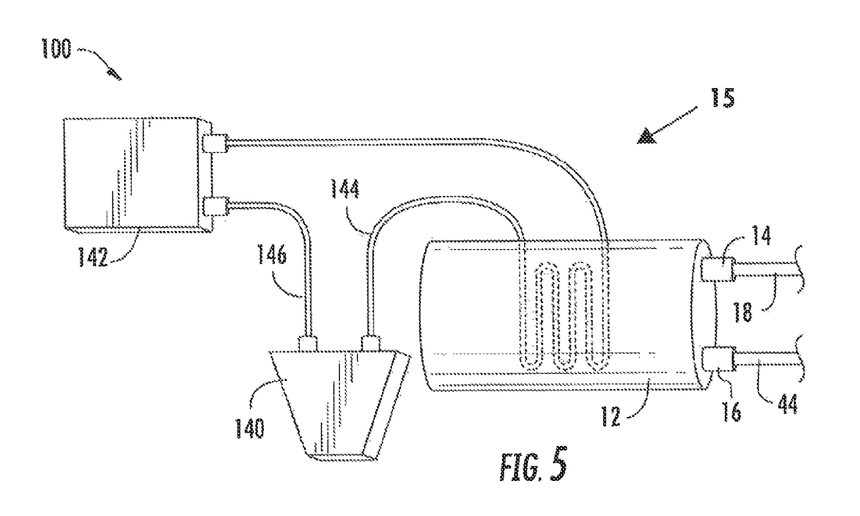
FIG. 5 provides a diagrammatic view of still another tank portion in accordance with still another exemplary embodiment of the present disclosure.

Referring now to FIG. 5, yet another exemplary embodiment of a tank portion 15 of the exemplary power generating system 10 of FIG. 1 is provided. The exemplary embodiment of FIG. 5 includes a heat collector system 100 incorporated into existing components of a cooling system of a vehicle. More particularly, the exemplary heat collector system 100 of FIG. 5 collects waste heat from an engine 140 positioned in the vehicle. During operation of the vehicle, the engine 140 generates heat (i.e., waste heat). Generally, coolant is pumped or otherwise directed to and through the engine 140 to capture some of the generated heat and cool the engine 140. The coolant is provided to the engine 140 through a hose 146. The hot coolant leaves the engine 140 through a hose 144 and the coolant may then be cooled by a radiator 142. The radiator 142 may then redirect the cooled coolant hack to the engine 140 through the hose 146. In the exemplary embodiment of the heat collector system 100 of FIG. 5, however, the relatively hat coolant traveling through the hose 144 may transfer at least a portion of the captured waste heat from the engine 140 to the tank 12 or the working liquid positioned therein. The coolant may then return/continue to the radiator 142. The exemplary heat collector system 100 in the tank portion 15 depicted in FIG. 5 may improve the efficiency of the vehicle's cooling system by assisting in the removal of waste heat from the coolant, while also generating electricity.

It should be appreciated, however, that the exemplary embodiment of FIG. 5 is provided by way of example only. In other exemplary embodiments, the tank portion 15 may have any other suitable configuration. For example, in other exemplary embodiments, the tank portion 15 may further include a heat sink system in thermal communication with the tank 12. More particularly, the tank portion 15 may include the hose 146 containing relatively cool coolant in thermal communication with the tank 12 and/or the working liquid positioned therein. Alternatively, the tank portion 15 may include a heat sink system circulating relatively cool fluid from, e.g., a radiator overflow reservoir, windshield washer fluid from a windshield washer fluid reservoir, or even fuel from a fuel tank.

One having ordinary skill in the art will readily appreciate from the teachings herein that the exemplary system 10 of FIG. 1 and the various embodiments of the tank portion 15 of the power generating system 10 with heating and cooling devices depicted in FIGS. 2 through 5 may provide a method (200) for generating energy, such as electrical power, using the expansion of the working liquid in the tank 12. For example, in one exemplary aspect, the method (200) may include at (202) cooling the working liquid in the tank to a first temperature. In certain exemplary aspects, cooling the working liquid in the tank to the first temperature may be accomplished using a cooling cycle of a cooling device. The cooling device may be a heat sink system in thermal communication with the tank and/or the working liquid. However, in other exemplary aspects, any other suitable cooling device may be provided for cooling the working liquid in the tank. For example, the cooling device for cooling the working liquid may include a shading structure having closed configuration, a fan to circulate air over and around the tank, and/or fins on the tank. Alternatively, however, the cooling the working liquid at (202) may include allowing the tank to sit overnight without exposure to radiant thermal energy from the sun.

Figure 6:
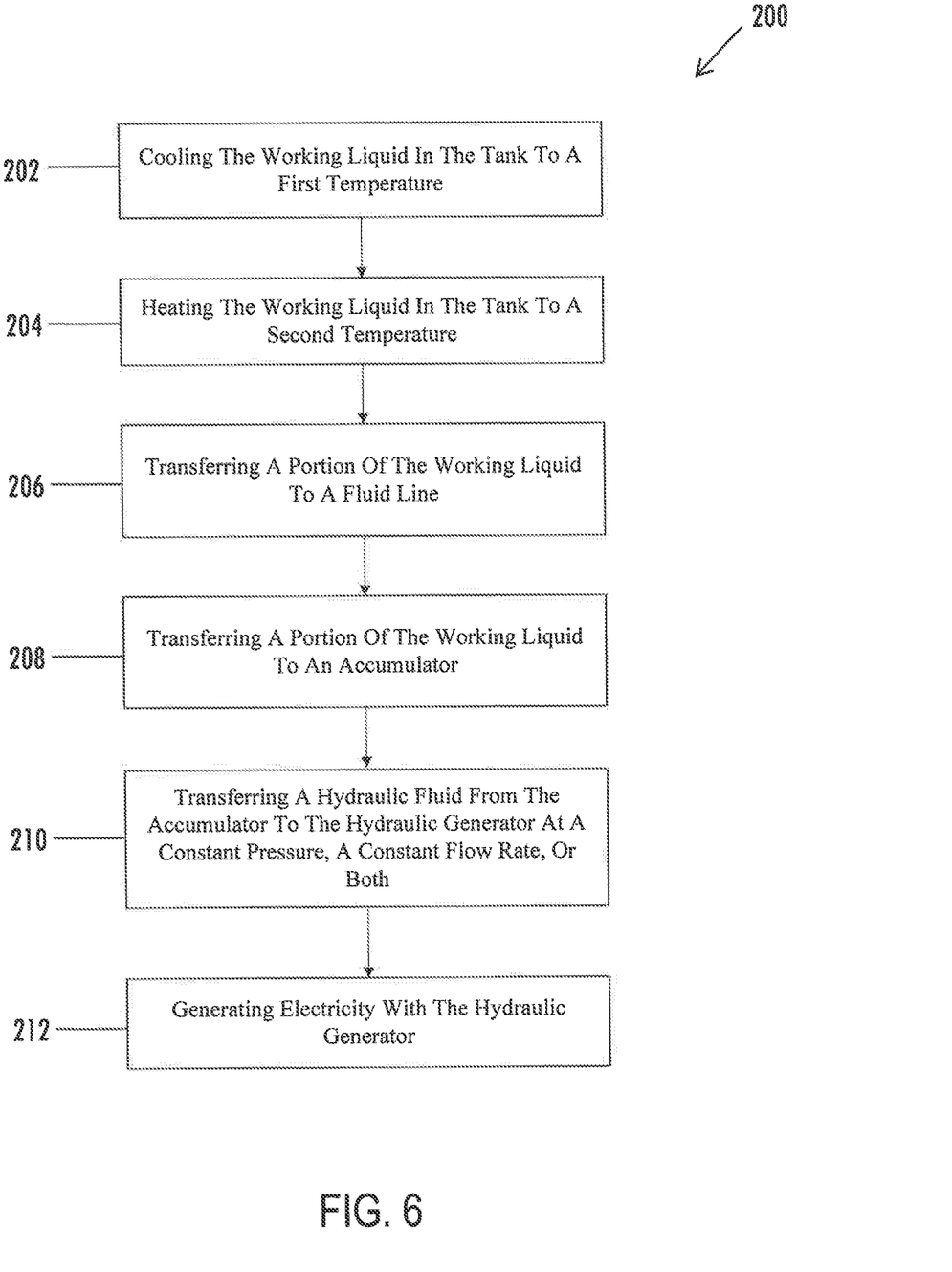
FIG. 6 provides a flow diagram of a method fir generating electricity using expanding liquid in accordance with an exemplary aspect of the present disclosure.

As the working liquid in the tank cools, a volume of the working liquid in the tank, and an internal pressure in the tank, may decrease, pulling working liquid in the tank from a reservoir in fluid communication with the tank.

Additionally, the method (200) may include at (204) heating the working liquid in the tank to a second temperature. Heating the working liquid at (204) may increase a volume of the working liquid, such that an internal pressure of the tank increases. In certain exemplary aspects, heating the working liquid may be accomplished using a heating cycle of a heating device, such as a heat collector system in thermal communication with the tank and/or the working liquid. In such an exemplary aspect, heating the working liquid in the tank may include circulating a thermal transfer fluid through a fluid line in thermal communication with the tank and/or the working liquid using a pump, the pump powered at least in part by the hydraulic generator. It should be appreciated, however, in other exemplary aspects, the working liquid may be heated by any other suitable heating device.

The method (200) further includes at (206) transferring a portion of the working liquid from the tank through a fluid line in fluid communication with the tank using the increased internal pressure in the tank. In certain exemplary aspects, the fluid line may be directly connected to the tank, while in other embodiments, the fluid line may be connected to a valve that is in fluid communication with the tank. In such an exemplary aspect, the method (200) may further include transferring the working liquid from the tank through the valve and through the fluid line. Moreover, in such an exemplary aspect, the valve may be a one-way valve to ensure proper fluid flow.

Further, for the exemplary aspect of FIG. 6, the method (200) at (208) includes transferring a portion of the working liquid to an accumulator from the fluid line, at (210) transferring a hydraulic fluid from the accumulator to the hydraulic generator at a constant pressure, a constant flow rate, or both, and at (212) generating electricity with the hydraulic generator using the portion of working liquid transferred through the fluid line. More particularly, the portion of working liquid transferred through the fluid line may increase the pressure in the accumulator, such that the accumulator may transfer hydraulic fluid to the generator at (210).

It should be appreciated that in certain exemplary aspects, the hydraulic fluid transferred from the accumulator to the hydraulic generator may be the same as the working liquid, while in other exemplary aspects, the hydraulic fluid may be any other suitable fluid.

It should also be appreciated that in other exemplary aspects, the method (200) may not include transferring working liquid to the accumulator, and may instead include transferring the working liquid directly to the hydraulic generator through the fluid line. In such an exemplary aspect, the hydraulic generator may or may not include an internal accumulator.

In still other exemplary aspects, the method (200) may further include returning hydraulic fluid to the accumulator from the hydraulic generator using one or more fluid lines. Additionally, or alternatively, other exemplary aspects may include transferring hydraulic fluid from the generator to a reservoir and transferring working liquid from the reservoir to the tank. In such an exemplary aspect, the hydraulic fluid may be the same as the working liquid.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A system for generating electrical power from the expansion of a working liquid, comprising:
   a tank comprising the working liquid and defining an internal pressure, the working liquid defining a temperature;
   a heating device in thermal communication with the working liquid in the tank for heating the working liquid in the tank and increasing the internal pressure of the tank, wherein the heating device for heating the working liquid in the tank is a closed-loop heat collector system, wherein the heat collector system comprises a heat collector and a fluid line with a thermal transfer fluid included therein, wherein the fluid line of the heat collector system extends into or otherwise thermally contacts the heat collector, and wherein the fluid line of the heat collector system additionally extends into the tank, extends around an outer surface of the tank, or both;
   a fluid line in fluid communication with the tank for receiving a portion of the working liquid from the tank in a liquid phase when the internal pressure of the tank increases; and
   a hydraulic generator in communication with the fluid line of the system and configured to generate electricity when the fluid line of the system receives working liquid in a liquid phase from the tank.

2. The system of claim 1, further comprising:
   a hydraulic accumulator in fluid communication with the fluid line and the hydraulic generator, the hydraulic accumulator configured to receive the working liquid transferred to the fluid line and transfer a fluid to the hydraulic generator at a constant pressure, a constant flow rate, or both.

3. The system of claim 1, further comprising:
   a second fluid line in fluid communication with the hydraulic generator and the tank and configured to return the working liquid to the tank after flowing through the hydraulic generator.

4. The system of claim 3, further comprising:
   a fluid reservoir in fluid communication with the second fluid line and the tank, the fluid reservoir configured to store and/or provide working liquid to the tank based at least in part on the internal pressure of the tank.

5. The system of claim 1, wherein the heating device for heating the working, liquid in the tank further includes a surface coating on the tank configured to receive thermal energy from the sun.

6. The system of claim 1, further comprising:
   a cooling device for cooling the working liquid in the tank from a second temperature to a first temperature, wherein the cooling device is in thermal communication with the tank, the working liquid in the tank, or both.

7. The system of claim 6, wherein the cooling device for cooling the working liquid in the tank is a heat sink in thermal communication with one or both of the tank and the working liquid positioned in the tank.

8. The system of claim 6, wherein the cooling device for cooling the working liquid in the tank is a shading structure positioned adjacent to the tank and configured to block any thermal energy from the sun.

9. The system of claim 1, wherein the tank comprises a pressure relief valve and the fluid line is in fluid communication with the tank through the pressure relief valve.

10. The system of claim 9, wherein the pressure relief valve prevents working liquid from flowing through the fluid line when the internal pressure in the tank is below an optimum threshold.

11. A method for generating electrical power using the expansion of a working liquid in a tank, the method comprising:
    heating the working liquid in the tank from a first temperature to a second temperature such that the volume of the working liquid increases using a heating device, wherein the heating device is a closed-loop heat collector system, wherein the heat collector system comprises a heat collector and a fluid line with a thermal transfer fluid included therein, wherein the fluid line of the heat collector system extends into or otherwise thermally contacts the heat collector, and wherein the fluid line of the heat collector system additionally extends into the tank, extends around an outer surface of the tank, or both;
    transferring a portion of the working liquid in the tank through a fluid line in a liquid phase in response to the increased volume of the working liquid; and
    generating electricity with a hydraulic generator in fluid communication with the fluid line using the portion of working liquid transferred through the fluid line in a liquid phase.

12. The method of claim 11, wherein heating the working liquid in the tank using the heating device in thermal communication with the tank comprises circulating the thermal transfer fluid through the fluid line of the heat collector system.

13. The method of claim 11, wherein heating the working liquid in the tank further comprises heating a surface of the tank using thermal energy from the sun.

14. The method of claim 11, wherein generating electricity with a hydraulic generator comprises flowing the working liquid through the hydraulic generator, the method further comprising returning the working liquid to the tank through a second fluid line after flowing the working liquid through the hydraulic generator; and cooling the working liquid positioned in the tank back to the first temperature after returning the working liquid to the tank through the second fluid line.

15. The method of claim 14, wherein cooling the working liquid positioned in the tank to the first temperature comprises cooling the working liquid positioned in the tank using a heat sink in thermal communication with the working liquid positioned in the tank.

16. The method of claim 11, wherein transferring a portion of the working liquid through a fluid line comprises transferring a portion of the working liquid through a fluid line to a hydraulic accumulator, and wherein the method further comprises:

transferring a hydraulic fluid from the hydraulic accumulator to the hydraulic generator at a constant pressure, a constant flow rate, or both.

* * * * *